United States Patent Office 2,801,950
Patented Aug. 6, 1957

2,801,950

ANTIBIOTIC COMPOSITIONS, AND METHOD, FOR COMBATING PLANT PATHOGENS

Kenneth B. Tate, Seaford, N. Y., assignor to Chas. Pfizer & Co., Inc., Brooklyn, N. Y., a corporation of Delaware No Drawing. Application December 23, 1953, Serial No. 400,100

17 Claims. (Cl. 167—33)

The present invention relates to antibiotic compositions, more particularly to mixtures of certain antibiotics. This application is a continuation-in-part of my copending application Serial No. 153,487, filed April 1, 1950, and now abandoned.

The tremendous development in the field of antibiotics and chemotherapy in the past few years has led to widespread use of these materials to combat a wide variety of infectious microorganisms. Many different types of antibiotics and similar chemotherapeutic agents have been discovered and prepared, each having its own bacterial spectrum. In other words each individual agent is extremely effective against only certain microorganisms, mildly effective against others and substantially ineffective against still others.

In determining the effectiveness of antibiotics and chemotherapeutic materials, there must be taken into account the tendency of some microorganisms to develop resistant strains or variants that show less susceptibility to these materials. This is a particularly serious factor if the antibiotic or chemotherapeutic treatment is only moderately effective and is just short of completely stopping growth of the infectious organism being fought. Often these antibiotic and chemotherapeutic agents are present in situ at levels just insufficient to completely inhibit all of the infective microorganisms.

A further problem encountered with such agents is the development of secondary infections which may not respond readily to the particular agent employed.

Among the objects of the present invention is the provision of novel antibiotic compositions that avoid the above as well as related prior art difficulties.

It is a specific object of the present invention to provide antibiotic compositions that are extremely effective against microorganisms which are resistant or tend to become resistant when treatment with a single antibiotic is used.

A further object of the present invention is the provision of antimicrobial compositions that are not significantly susceptible to the development of resistant strains of microorganisms against which they are designed to be used.

A still further object of the present invention is antimicrobial compositions that are highly effective against both primary and secondary infective microorganisms.

These and other objects are accomplished by the present invention which provides useful mixtures of a streptomycin type antibiotic and a tetracycline type antibiotic having a chemical structure characterized by a tetracycline nucleus, such as oxytetracycline, chlortetracycline and tetracycline. Oxytetracycline is also known under the trademark "Terramycin" and chlortetracycline, under the trademark "Aureomycin." These antibiotic mixtures are exceedingly effective in inhibiting the growth of primary and secondary infective organisms and in reducing the tendency for the development of resistant strains, particularly organisms of the Pseudomonas, Proteus, Erwinia, and Xanthamonas genera.

The Pseudomonas genus refers to short Gram-negative bacteria that are generally found in soil and water, particularly polluted water and sewage, and in growing produce a water-soluble green, blue or yellowish-green pigment that diffuses through the growth medium. Species of this genus, such as *Pseudomonas aeruginosa* are pathogenic infective agents often of the secondary infective type as explained above. While often considered a human pathogen, *Pseudomonas aeruginosa* is also regarded as identical with one of the plant pathogens, *Pseudomonas polycolor* (see Elrod and Braun, Jour. Bact., 44, 1942, 633). This organism attacks tobacco plants of the species, *Nicotiana tabacum*, causing leaf spots and lesions, the young seedlings developing wet rot (Elliott, Manual of Bacterial Plant Pathogens, p. 81, 1951). Another species, *Pseudomonas phaseolicola*, is responsible for the halo spot or halo blight of beans, resulting in wilting of a part or all of the plant and/or water-soaked lesions or leaf spots.

The Proteus genus refers to Gram-negative highly motile bacteria found mostly in intestines and putrefying organic matter. These bacteria form amoeboid colonies decompose proteins, and generate gas and acid when grown with dextrose and generally when grown with sucrose but not when grown with lactose. The species *Proteus vulgaris* is a typical infective organism against which the novel compositions are highly effective.

The Erwinia genus occurs in the form of Gram-negative rods which are pathogenic to plants, generally attacking the plant tissues and producing local lesions. Among other things, various species of this genus are responsible for soft rot in carrot, cabbage, celery, cucumber, eggplant, and other vegetable plants; spot disease of citrus fruits; root rot of cotton; stem rot or black leg in potato; and wilt of cucumbers, cantaloupes, muskmelons, pumpkins, and squashes. The species, *Erwinia amylovora*, is particularly troublesome in connection with the blight of apple and pear blossoms, causing a disease widely known as "fire blight." This disease also attacks such ornamentals as walnut, flowering quince, flowering hawthorne, pyracantha (the firethorn bush) and mountain ash, to name a few.

The Xanthamonas genus accounts for blight, spot disease, etc., of a considerable variety of plants. *Xanthamonas phaseoli* causes a bacterial bean blight which is widespread throughout the United States, Canada and many other countries. The species *Xanthamonas vesicatoria* is also quite widespread, being responsible for the bacterial spot of tomatoes and peppers.

Tetracycline is a recently discovered antibiotic characterized by a tetracyclic aromatic nucleus, also common to oxytetracycline and chlortetracycline. Oxytetracycline and chlortetracycline structurally differ from one another and from tetracycline primarily in that oxytetracycline contains a nuclear hydroxy group that neither tetracycline nor chlortetracycline possesses, while chlortetracycline contains a nuclear chlorine atom that neither oxytetracycline nor tetracycline possesses. Oxytetracycline can be recovered from the metabolism products of *Streptomyces rimosis*, as more fully described in U. S. Patent 2,516,080 to Sobin et al., issued July 18, 1950, and referring to the antibiotic by its trademark "Terramycin." Chlortetracycline in turn can be recovered from the metabolism products of *Streptomyces aureofaciens*, as described in U. S. Patent 2,482,055 to Duggar, issued September 13, 1949, and referring to the antibiotic by its trademark "Aureomycin." Tetracycline is readily produced by the catalytic dehalogenation of chlortetracycline, or it can also be produced directly by fermentation methods from selected strains of microorganisms of the genus Streptomyces.

In this specification and in the claims the expression,

"a tetracycline-type antibiotic" means an antibiotic having a chemical structure characterized by a tetracycline nucleus and refers not only to pure or free oxytetracycline, chlortetracycline and tetracycline, but also to their antibiotically active derivatives, in which form they are or can be used. Such derivatives include calcium chloride combination products, hydrochlorides, sodium and potassium salts, quaternary ammonium salts and the like. Similarly, the expression "oxytetracycline antibiotic" refers not only to free oxytetracycline but also to such derivatives, combination products and/or salts, except where otherwise indicated.

Streptomycin is the name applied to a well-known antibiotic metabolism product of *Streptomyces griseus*, a microorganism generally found in soils. This antibiotic and its method of preparation is plentifully described in the literature. See for example Waksman—"Microbial Antagonisms and Antibiotic Substances," New York, The Commonwealth Fund, 1947, p. 193–200. For the purposes of the present invention the expression, "a streptomycin type antibiotic" will refer generically to the streptomycin itself as well as its antibiotically active compounds and derivatives, such as the sulfate, hydrochloride, calcium chloride complex, the dihydro product, dihydrostreptomycin, dihydrostreptomycin sulfate, hydrochloride, etc. The expression "a streptomycin antibiotic" refers to free streptomycin, its compounds and/or salts, except when otherwise indicated.

According to the present invention mixtures of a streptomycin type antibiotic together with a tetracycline type antibiotic are exceptionally effective against infective organisms of the type indicated above, and particularly inhibit the development of resistant strains thereof. Such mixtures contain from about 5 to 99.5 percent by weight of the streptomycin type antibiotic, the balance being the tetracycline type antibiotic. The streptomycin type antibiotic is advantageously employed as the principal active ingredient, with the tetracycline type antibiotic in an amount sufficient to suppress the development of the resistant strains. A proportion of the tetracycline type antibiotic from about 0.5 to 25% by weight of the total antibiotic content of the mixture, preferably about 10%, is generally effective for this purpose. Of course, much higher proportions, as indicated, may be used to meet the needs of individual situations. The antibiotics may be in their pure forms, in dilute forms, or in the form of crude concentrates, as long as each is employed in an amount sufficient to provide biologically-active material in the proportions specified. These mixtures are conveniently obtained by combining a streptomycin type antibiotic having from about 30 to 800 micrograms of potency per milligram with a tetracycline type antibiotic having from about 30 to 950 micrograms of potency per milligram. The potency of the antibiotics is readily determined by standard chemical and/or microbiological assay techniques.

Without limiting the invention in any way, there are given below examples illustrative of the significant advantages contributed by the invention.

*Example I*

A strain of *Pseudomonas aeruginosa* was grown in tubes in nutrient broth containing beef extract and bacto-peptone and separate portions were treated with amounts of oxytetracycline and streptomycin individually, as well as in mixture, the amounts being just insufficient to bring about complete inhibition of the microorganism, while incubating the tubes at 37° for 24 hours. The amounts of antibiotics were recorded. Samples of the culture were transferred to fresh medium, the treatment repeated and the amounts of the antibiotics which would just not completely inhibit growth after the transfer, were also recorded. This process was repeated with a number of additional transfers, recording the antibiotic concentrations necessary at each stage. Using oxytetracycline hydrochloride as the antibiotic, it was found that at the eighth transfer 140 micrograms per milliliter (mcg./ml.) of the antibiotic was necessary. With streptomycin sulfate, a concentration of 200 mcg./ml. was found to be necessary after only five transfers. However, when a mixture containing equal weights of oxytetracycline hydrochloride and streptomycin sulfate was used, after fifteen transfers a concentration of just over 60 mcg./ml. was still sufficient to completely inhibit growth of the *Pseudomonas aeruginosa* strain.

*Example II*

Using the same parent strain of *Pseudomonas aeruginosa* it was found that, after eleven transfers with increasing amounts of free oxytetracycline, a concentration of just over 100 mcg./ml. was required to inhibit the growth of the resistant strain that had developed. However, when a mixture of equal weights of free oxytetracycline base and streptomycin sulfate was used, after seven transfers just over 24 mcg./ml. of the mixed antibiotics was sufficient to completely inhibit growth of this strain. After fifteen transfers the same concentration was capable of completely inhibiting growth. This demonstrates in a remarkable manner how the appearance of resistant strains of Pseudomonas is inhibited by the compositions of the invention.

*Example III*

In this case, a pathogenic strain of Proteus which had been isolated from an infected human case, was used. When subjected to the action of oxytetracycline hydrochloride, the strain required just over 160 mcg./ml. of the antibiotic for complete inhibition after only three transfers. Using streptomycin sulfate alone as the agent, the strain was only inhibited by using slightly more than 70 mcg./ml. after ten transfers, and after fifteen transfers just more than 100 mcg./ml. was required. When a mixture of equal weights of oxytetracycline hydrochloride and streptomycin sulfate was used as the agent, just slightly more than 40 mcg./ml. was required for complete inhibition of growth after nine transfers. The organism then seemed to become even more susceptible since after fifteen transfers there was no growth when as little as 24 mcg./ml. of the mixed composition was used.

*Example IV*

When a mixture containing 25% by weight of oxytetracycline hydrochloride and 75% by weight of streptomycin sulfate was used against the strain of *Pseudomonas aeruginosa* of Example I, it was found that just slightly more than 60 mcg./ml. was necessary to completely inhibit the growth of this strain after nine transfers. A mixture containing 50% of each of the antibiotics had the same effect on this organism. However, when a mixture containing 75% oxytetracycline hydrochloride or 90% oxytetracycline hydrochloride (the remainder being streptomycin sulfate) was used, there was complete inhibition of the growth of this strain of Pseudomonas after nine transfers with a concentration of just over 40 mcg./ml.

*Example V*

Using the strain of Proteus referred to in Example III, it was found that a mixture containing 10% oxytetracycline hydrochloride and 90% streptomycin sulfate by weight, when used at a concentration of just over 30 mcg./ml. completely inhibited growth of the organism after nine transfers. A mixture containing 25% oxytetracycline hydrochloride and 75% streptomycin sulfate required a slightly higher concentration, just over 40 mcg./ml., after nine transfers. The mixture containing 50% of each of the antibiotics was effective at the same concentration level, just over 40 mcg./ml., after nine transfers. In the case of a 75% oxytetracycline hydrochloride-25% streptomycin sulfate mixture, slightly more than 60 mcg./ml. was required for complete inhibition of this strain of Proteus after nine transfers.

Example VI

A similar series of tests were conducted with *Erwinia amylovora* in a brain-heart medium incubated at 28° C. for about 24 hours. After 12 transfers, the resistant strain which emerged required over 500 mcg./ml. of streptomycin sulfate to inhibit growth. On the other hand, with the addition of 1 percent oxytetracycline hydrochloride to the streptomycin sulfate only 10 mcg./ml. of the mixed antibiotics were required for inhibition after 12 transfers, and with 10 percent oxytetracycline hydrochloride added to the streptomycin sulfate, as little as 2 mcg./ml. were found to effect complete inhibition. As in the previous examples, these tests show that combinations of streptomycin and oxytetracycline retarded the emergence of resistant strains to a greater extent than the single antibiotic.

Example VII

Further tests demonstrated that the described combinations of antibiotics are also highly effective in inhibiting the growth of *Xanthamonas vesicatoria*, *Xanthamonas phaseoli* and *Pseudomonas phaseolicola*. Both species of Xanthamonas were completely inhibited by 1 mcg./ml. of a streptomycin salt mixed with an equal amount of oxytetracycline or one of its salts. Equal proportions (50 mcg./ml.) of the two antibiotics also inhibited the growth of *Pseudomonas phaseolicola*. The streptomycin salt could be substituted with like effect by a dihydrostreptomycin salt.

Example VIII

Still further tests showed that the new compositions of this invention are noteworthy in their activity against various mycobacteria. Thus, in the case of *Mycobacterium ranae*, the total weight of a 10% oxytetracycline hydrochloride-90% streptomycin sulfate combination which produced inhibition was approximately 0.084 mcg./ml. Of this total weight, 0.008 mcg./ml. was oxytetracycline hydrochloride and 0.076 mcg./ml. was streptomycin sulfate. A 25% oxytetracycline hydrochloride-75% streptomycin sulfate combination also was effective, the MIC (minimum inhibitory concentration) of oxytetracycline being 0.025 mcg./ml., and that of streptomycin 0.075 mcg./ml. On the other hand, the MIC for both forms of oxytetracycline and streptomycin, when they were used separately, was 0.1 mcg./ml.

Example IX

In other tests, mixtures of streptomycin sulfate and tetracycline hydrochloride were found to be highly effective against *Erwinia amylovora* and *Xanthamonas phaseoli*. Paper discs which had been impregnated with a solution containing a mixture of these salts in an amount to provide 3.175 micrograms per milliliter of streptomycin and tetracycline activity, respectively, inhibited the growth of *Erwinia amylovora* when placed on agar plates seeded with that organism and incubated for 24 hours. Under similar conditions, *Xanthamonas phaseoli* was inhibited by a solution having 1.5 micrograms of streptomycin activity and 5 micrograms of tetracycline activity per milliliter.

Example X

Mixtures of streptomycin sulfate and chlortetracycline hydrochloride were also tested in accordance with the procedure of Example IX and found to inhibit the growth of *Erwinia amylovora* and *Xanthamonas phaseoli* at corresponding concentrations of the two antibiotics.

For general use, a mixture of approximately equal parts by weight of a streptomycin-type antibiotic and a tetracycline-type antibiotic are suitable. As previously pointed out, however, it is preferred to employ a lesser proportion of the tetracycline-type antibiotic for most purposes. Such mixtures are highly effective against many kinds of plant and human pathogenic microorganisms and are in no sense limited for use against the genera of infectious microorganisms described above for illustrative purposes. While they may be applied in a variety of forms, as in powders, solutions or dispersions in water, salves or other vehicles and bases containing as little as 1% by weight of the combined antibiotics, they are particularly useful against plant pathogens in the form of aqueous sprays.

The efficacy of the compositions of this invention against various plant pathogens has been further demonstrated by extensive field tests with aqueous sprays containing various concentrations of streptomycin hydrochloride and a quaternary ammonium salt of oxytetracycline. In these tests, such combinations were employed in the treatment and prevention of fire blight, an important tree disease affecting apples, pears and other species. Fire blight has limited the production of susceptible varieties of apples in many areas of the country and has all but wiped out commercial pear growing east of the Rocky Mountains. The disease is caused by a bacterium, *Erwinia amylovora*, which invades the new growth, causing it to die back, and thereby producing the characteristic appearance called fire blight. Infection occurs principally through the blossoms. In both apples and pears, infected blossoms fail to bear and infected limbs must be pruned with the loss of bearing wood and frequently with severe damage to the tree. No satisfactory control measures have heretofore been developed for this disease.

In one series of tests a block of approximately 100 Jonathan apple trees was treated with the aforesaid formulations of oxytetracycline and streptomycin. The combination of oxytetracycline and streptomycin in aqueous sprays containing from 250 to 500 p. p. m. (parts per million) of total antibiotic activity was found to be extremely effective in controlling fire blight in these trees. In antibiotic concentrations as low as 100 p. p. m., fire blight was completely controlled where the spray schedule was started in either the balloon stage or at 30% to 50% of full bloom.

In other tests it has been clearly demonstrated that the action of these antibiotics in controlling plant diseases is systemic, the antibiotics being absorbed in the foliage and succulent tissues of young shoots. Thus the antibiotics penetrate the plant tissue and protect the same against internal invasion by the bacteria. Once absorbed by the plant tissue, the antibiotics are translocated by the plant or tree from its lower to its upper regions. This offers a decided advantage over other agents in that treatment may be confined to the lower foliage and still render more inaccessible regions of the tree immune to bacterial attack. Despite the absorption of the antibiotics, however, it has been found that fruit from trees treated with concentrated sprays containing streptomycin and oxytetracycline contain no ascertainable amounts of these antibiotics.

Comparable results are obtainable against other bacterial plant diseases, such as the bacterial leaf spot of tomato and pepper plants caused by *Xanthamonas vesicatoria*. As in the case of fire blight, no effective control has heretofore been developed for this disease. It appears in wet weather and spreads rapidly, attacking plants of all ages and causing both destruction of foliage and spotting of fruit. Other diseases against which the compositions of this invention may be employed are the halo blight and common blight of beans, both of which are serious bacterial diseases in the United States and Canada. Halo blight is caused by *Pseudomonas phaseolicola* and common blight by *Xanthamonas phaseoli*, both of which are inhibited by combinations of a tetracycline-type antibiotic and a streptomycin-type antibiotic at concentrations as low as 50 mcg./ml.

The amounts of mixed streptomycin and tetracycline-type antibiotics to be employed against any given bacterial disease of plants will vary considerably, depending upon the particular circumstances and the conditions of use. While both types of antibiotics may be used in pure form, i. e. without the addition of other ingredients, they are for most purposes more advantageously incorporated with carriers and/or diluents, as well as active materials. In particular, they may be prepared in the form of sprays, emulsions, dusting powders, concentrates and the like, wherein the combined antibiotic content may vary from less than 1 to as high as 95% by weight of such compositions. Of these, it is preferred to employ aqueous sprays or dispersions, which are readily prepared by incorporating the antibiotics with suitable wetting agents, preferably non-ionic wetting agents in powder form. Examples of such wetting agents are "Pluronic F68" (ethylene oxidepolyoxypropylene base), "Triton X100" (an alkylated aryl polyether alcohol), "Igepal" (an alkyl aryl polyethylene glycol ether), and "Emulfor" (polyethylene ethers of long chain fatty acids and alcohols); compatible liquid wetting agents can also be employed by adsorbing them on inert carriers for blending purposes. It is also desirable to employ an acidic material in such formulations, preferably an organic acid such as citric acid or tartaric acid, although inorganic acids such as hydrochloric acid are also suitable in some instances. The acid is generally employed in an amount sufficient to maintain the pH of the final solution below 7, thereby stabilizing the resulting compositions. In preparing aqueous sprays, these materials are advantageously mixed to form a dry powder which may be diluted to the proper concentration with water immediately prior to application to the plants or trees to be sprayed. In such event inert, non-adsorbent carriers are useful in such powders or concentrates as diluents to facilitate proper proportioning of the ingredients. Suitable carriers include pyrophyllite, an aluminum silicate sold under the trademark "Pyrax ABB," Barden clay, Perry clay and diatomaceous earth. Dusting powders can, of course, be prepared with these same materials.

The concentration of the antibiotics in sprays will, of course, depend upon their relative proportions in any concentrate and the degree of its dilution with water, a wide range of concentrations being possible. However, it is preferred to apply sprays containing the streptomycin-type antibiotic in concentrations of from about 30 to 500 p. p. m. combined with the tetracycline-type antibiotic in concentrations of from about 3 to 50 p. p. m. for best results. It has been found that sprays containing these concentrations are well tolerated by plants without adverse effects.

A typical concentrate suitable for dilution with water to prepare an aqueous spray is set forth below:

| | Grams |
|---|---|
| Streptomycin sulfate (600 mcg./mg. potency) | 66.76 |
| Oxytetracycline quaternary ammonium salt (460 mcg./mg. potency) | 8.63 |
| Pluronic F68 | 20.00 |
| Citric acid | 5.50 |
| Pyrax ABB | 164.08 |

As indicated above, "Pluronic F68" is a wetting agent, citric acid furnishes the desired acidity in the final solution and "Pyrax ABB" acts as a carrier for the composition. This composition when diluted with 100 gallons of water provides an excellent spray containing approximately 105 p. p. m. streptomycin and 10.5 p. p. m. oxytetracycline, the pH of the spray solution being between about 4.5 and 4.7 under ordinary conditions. This spray is particularly effective on controlling blossom and twig fire blight of fruit trees when applied to such trees at full pink, 20 to 35% bloom and full bloom. Of course, numerous other formulations may be compounded to meet the requirements for combating other diseases and for various conditions of use.

While aqueous sprays are the preferred mode of application for the compositions of this invention, the antibiotics may be applied in dusts or other forms as previously explained. The antibiotics may also be suspended or dissolved in waxes, resins, particularly the natural resins or gums, and they may be incorporated in a variety of other carriers, including those frequently employed in conjunction with the usual agricultural agents. Such compositions may contain stabilizers, spreading agent, fungicides such as zinc ethylenebisdithiocarbamate and ferric dimethyldithiocarbamate, other anti-bacterial agents, and in some instances, even insecticides.

Resort may be had to such modifications and equivalents as fall within the spirit of the invention and the scope of the appended claims.

What is claimed is:

1. An agricultural composition for combating plant pathogens comprising a streptomycin type antibiotic and a tetracycline type antibiotic, the streptomycin content of the composition ranging from about 5 to 99.5% by weight of the total antibiotic content.

2. An agricultural composition for combating plant pathogens comprising a streptomycin type antibiotic, a tetracycline type antibiotic, and a carrier therefor, the streptomycin content of the composition ranging from about 5 to 99.5% by weight of the total antibiotic content.

3. An agricultural composition for combating plant pathogens comprising a mixture of a streptomycin antibiotic having from about 30 to 800 micrograms of potency per milligram, and an oxytetracycline antibiotic having from about 30 to 950 micrograms of potency per milligram, the streptomycin content of the composition ranging from about 5 to 99.5% by weight of the total antibiotic content.

4. An antibiotic composition useful in combating plant pathogens comprising a streptomycin antibiotic as the principal active ingredient, an oxytetracycline antibiotic in an amount sufficient to inhibit the emergence of resistant strains of pathogenic microorganisms, a non-ionic wetting agent, an organic acid, and a non-adsorbent powdered carrier therefor.

5. An antibiotic composition useful in combating plant pathogens comprising a streptomycin antibiotic as the principal active ingredient, an oxytetracycline antibiotic in an amount of about 10% by weight of the total active antibiotic content, an ethylene oxide polyoxypropylene base wetting agent, citric acid, and an aluminum silicate carrier therefor.

6. An agricultural spray for inhibiting the growth of plant pathogens composed of an aqueous solution containing from about 30 to 500 p. p. m. of a streptomycin antibiotic and from about 3 to 50 p. p. m. of an oxytetracycline antibiotic.

7. An agricultural spray for inhibiting the growth of plant pathogens composed of an aqueous solution containing from 30 to 500 p. p. m. of a streptomycin antibiotic and from 3 to 50 p. p. m. of an oxytetracycline antibiotic, the pH of the solution being maintained below 7.

8. The composition of claim 2 in which the carrier is water.

9. The composition of claim 4 dispersed in water.

10. A method for combating plant pathogens which comprises applying to the infection site of the plant a composition comprising a mixture of streptomycin and oxytetracycline antibiotics in which the streptomycin content is from about 5 to 99.5% by weight of the total antibiotic content.

11. An antibiotic composition useful in combating plant pathogens comprising a streptomycin antibiotic as the principal active ingredient, a chlortetracycline antibiotic in an amount sufficient to inhibit the emergence of resistant strains of pathogenic microorganisms, a non-ionic wetting agent, an organic acid, and a non-adsorbent powdered carrier therefor.

12. An agricultural spray for inhibiting the growth of plant pathogens composed of an aqueous solution containing from about 30 to 500 p. p. m. of a streptomycin antibiotic and from about 3 to 50 p. p. m. of a chlortetracycline antibiotic.

13. An agricultural composition for combating plant pathogens comprising a mixture of a streptomycin antibiotic having from about 30 to 800 micrograms of potency per milligram, and a chlortetracycline antibiotic having from about 30 to 950 micrograms of potency per milligram, the streptomycin content of the composition ranging from about 5 to 99.5% by weight of the total antibiotic content.

14. An antibiotic composition useful in combating plant pathogens comprising a streptomycin antibiotic as the principal active ingredient, a tetracycline antibiotic in an amount sufficient to inhibit the emergence of resistant strains of pathogenic microorganisms, a non-ionic wetting agent, an organic acid, and a non-adsorbent powdered carrier therefor.

15. An agricultural spray for inhibiting the growth of plant pathogens composed of an aqueous solution containing from about 30 to 500 p. p. m. of a streptomycin antibiotic and from about 3 to 50 p. p. m. of a tetracycline antibiotic.

16. An agricultural composition for combating plant pathogens comprising a mixture of a streptomycin antibiotic having from about 30 to 800 micrograms of potency per milligram, and a tetracycline antibiotic having from about 30 to 950 micrograms of potency per milligram, the streptomycin content of the composition ranging from about 5 to 99.5% by weight of the total antibiotic content.

17. A method for combating plant pathogens which comprises applying to the infection site of the plant a composition comprising a mixture of a streptomycin antibiotic and a tetracycline type antibiotic in which the streptomycin antibiotic content is from about 5 to 99.5% by weight of the total antibiotic content.

References Cited in the file of this patent

UNITED STATES PATENTS

| | | |
|---|---|---|
| 2,498,374 | Martin | Feb. 21, 1950 |
| 2,720,727 | Pidacks | Oct. 18, 1955 |
| 2,749,230 | Kaplan | June 5, 1956 |

OTHER REFERENCES

Ark: Effect of Crystalline Streptomycin on Phytopathogenic Bacteria and Fungi (Abstr.) Phytopath., vol. 37, 1947, p. 842.

J. A. P. A.: Prac. Pharm. Ed., April 1947, p. 224.

Welch, in J. A. P. A., April 1950, pp. 185–192.

Waksman: Streptomycin, Williams and Wilkins Co., Baltimore, Md., 1949, pp. 282, 430 and esp. 504.

Keefer: Antibiotics Up to Date, Merck Rpt., April 1952, pp. 3–8, esp. page 6.

Kolmer: Synergistic or Additive Activity of Chemotherapeutic Compounds, Am. J. Med. Sci., February 1948, pp. 136–148, esp. at pp. 146–148.

Waksman: "Antibiotics of Actimomycetes . . ." Conference on Antibiotic Res., Washington, D. C., Jan. 31, and Feb. 1, 1947, 9 pp. mimeographed, esp. at page 6.

Mayo: (Proc. Staff Meeting of the Mayo Clinic), Mar. 16, 1949, vol. 24, pp. 133–145.